(No Model.)
J. G. PARSONS.
VEHICLE SPRING.
No. 266,047. Patented Oct. 17, 1882.
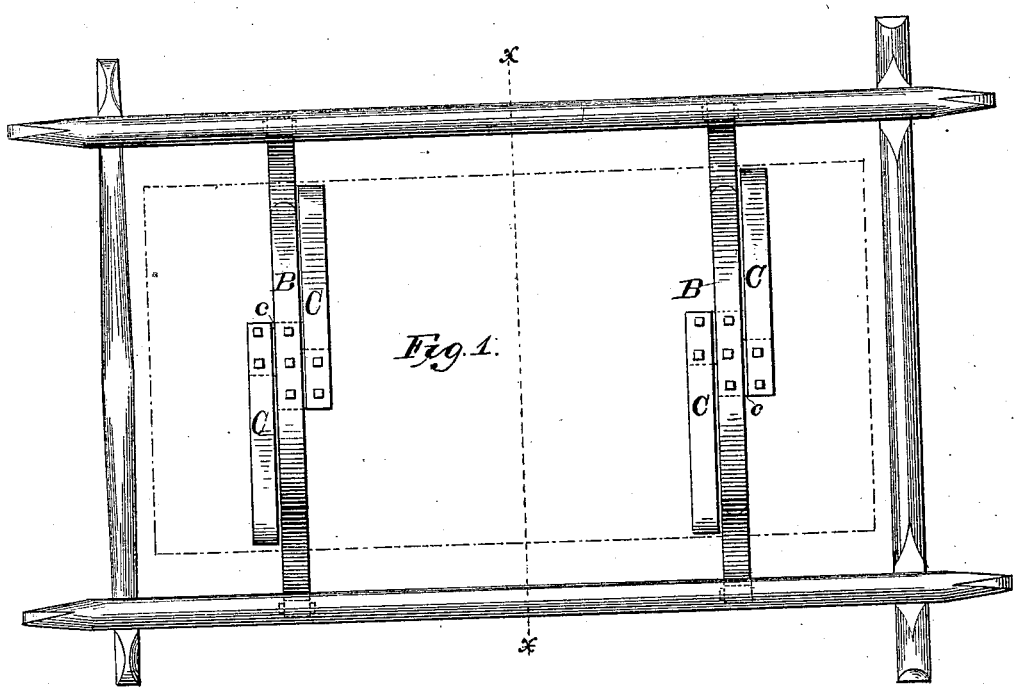
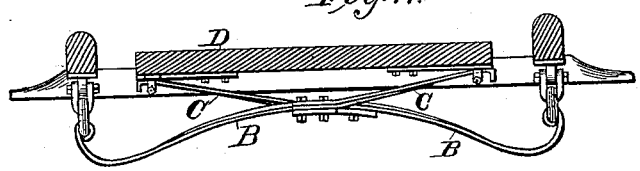
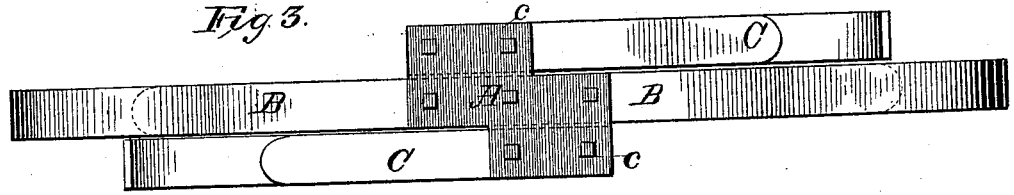
Witnesses:
E. G. Asmus
Carl Pickhardt
Inventor:
John G. Parsons,
By
Stout & Underwood
Attorneys.

UNITED STATES PATENT OFFICE.

JOHN G. PARSONS, OF OSHKOSH, WISCONSIN.

VEHICLE-SPRING.

SPECIFICATION forming part of Letters Patent No. 266,047, dated October 17, 1882, Application filed May 18, 1882. (No model.)

*To all whom it may concern:*

Be it known that I, JOHN G. PARSONS, of Oshkosh, in the county of Winnebago, and in the State of Wisconsin, have invented certain new and useful Improvements in Vehicle-Springs; and I do hereby declare that the following is a full, clear, and exact description thereof.

My invention relates to vehicle-springs; and it consists in combining two supplemental springs with each of the semi-elliptic cross-springs of a side-bar wagon.

In the drawings, Figure 1 is a top view of my invention. Fig. 2 is an end view, and Fig. 3 is a bottom view.

A is a plate, which I make in the form of two squares joined at one corner. The center of this plate forms a long bearing for the semi-elliptic cross-spring B, while its wings c c form bearings for the end of short springs C, these latter pointing in different directions from each other and their free ends projecting up and out to receive the platform or body D, the ends of the spring B being shackled to the side bars, E.

It will be seen that by reason of the peculiar shape of the plate A the springs C may be set back so that their inner ends will project beyond each other, so that I can get a greater length of spring than has heretofore been possible in the same compass, and thereby accomplish with two halves of a long semi-elliptic spring a better result than has heretofore been attained by the combination of two complete short semi-elliptic springs with the long semi-elliptic cross-spring, and I avoid the short jerky motion that is so common to this style of spring, for they are necessarily secured to their bearing-plates centrally, and therefore they lose about one-third of their length, while my springs are secured to their bearing-plate each to an opposite side of its longitudinal center, and consequently I can have a much greater length of spring—about two inches—on each side, which makes a vast deal of difference in the comfortableness of the vehicles, and my half-springs have all the steadying effect of the pair of whole springs that have hitherto been employed.

What I claim as my invention, and desire to secure by Letters Patent, is—

1. The combination, with one of the main semi-elliptic cross-springs of a side-bar wagon, of two supplemental springs attached at one end to a bearing-plate in the center of the main cross-spring, said supplementary springs extending in different directions from each other, as set forth.

2. The combination, with spring B, of supplementary springs C C and plate A, as and for the purpose set forth.

In testimony that I claim the foregoing I have hereunto set my hand on this 14th day of April, 1882, in the presence of two witnesses.

JOHN G. PARSONS.

Witnesses:
S. S. STOUT,
HAROLD G. UNDERWOOD.